United States Patent Office 2,754,212
Patented July 10, 1956

2,754,212
METHOD OF STABILIZING WINES

William A. Wiseman, London, England, assignor to W. & A. Gilbey Ltd., London, England, a corporation of England No Drawing. Application January 26, 1953, Serial No. 333,365

Claims priority, application Great Britain February 13, 1952

17 Claims. (Cl. 99—35)

This invention concerns a new or improved method for stabilizing wine (which term is used in its generic sense to include liquors comprising fermented fruit juices).

It is well known that wines are liable to throw down deposits after being bottled ready for the market. These deposits are intimately connected with the ageing of wines and tho they are harmless, they adversely affect the appearance and character of the wine. The throwing of deposits can be caused by many agencies. For instance, temperatures considerably below cellar temperature will cause a deposit of potassium hydrogen tartrate and other matters, while excessive heat and exposure to light will often cause turbidity and later deposits. Excessive quantities of many metals, principally iron and copper, but also manganese, zinc, calcium, cadmium, and other metals will cause turbidity and deposits. Most of these disorders are caused directly by, or take place only in the presence of, normal quantities of the metals concerned. By the virtual elimination of all metals except sodium, and by other means as described hereinafter, the wine can be made to remain in perfect condition under most situations for a very long time.

The turbidity or deposits in wine caused by the presence of potassium hydrogen tartrate are due to the fact that its solubility varies with temperature, so that if the temperature is lowered at any time after the wine leaves the vintners, some tartrate is precipitated, and deposits and cloudiness are apparent. Coloring matter and other substances are also thrown down for the same reason with a fall in temperature, so that even if the potassium hydrogen tartrate were eliminated in all wines except those very lightly colored, cloudiness would still be apparent in the cold. Prolonged refrigeration of wines is used to overcome this trouble. Holding of the wines at temperatures near its congelation point (15–22° F.) for many days will, of course, effectively precipitate all the excess tartrate and cause the coloring and other substances to deposit. The precipitate may then be filtered off when the wine is cold, so that it will retain its brilliancy and condition for a very long time. The plant required for this process is large and expensive both to install and use and the process suffers from the disadvantage that the color of the wine is very considerably affected.

An excess of potassium hydrogen tartrate can be reduced by the addition of pure calcium carbonate when the practically insoluble calcium tartrate precipitates, this substance being thereafter removed by filtering. This method is only applicable to wines of high acidity as this is correspondingly reduced and deposits will still occur with lowered temperatures for the reasons above and because, to a certain extent, the solubility of calcium tartrate varies with temperature in the same way as potassium hydrogen tartrate.

It has further been proposed to avoid potassium hydrogen tartrate deposits in the cold by eliminating the potassium in wines. This exists, as is usual in aqueous media, in the form of ions and these are exchanged (by means of an ion-exchange material) for sodium ions, which are harmless and do not cause deposits. By this means also the other metals in wines are converted to a very great extent to sodium ions. Not only does this method fail in eliminating these other metals entirely, it also fails to protect wines, except lightly colored wines, from the cold for the reasons given above. A further method exists which involves contacting a wine not only with a cation-exchange material to remove potassium and other obnoxious metals, but also with an anion-exchange material to remove tartrate ions. This two-stage process suffers from its complications. In addition, all the previous ion-exchange materials which have been proposed adversely and considerably affect both the flavor and character of the wine and its acidity. Attempts to overcome this loss of acidity have always introduced unnecessary complications. Some have proposed re-acidification of the wine by passing it thru a hydrogen zeolite and others that, instead of using neutral sodium chloride as a regenerant, acid should be added to the regenerant. This prevents the wine from being bottled directly after treatment, as the first runs are much more acid than those later, and the whole effluent must be mixed so that the acidity of the wine is near that of the original wine. The degree of protection against the disorders above is also reduced by this procedure.

Pursuant to the present invention, by which all the previous procedures are greatly improved upon, use is made of sulfonated polystyrene ion-exchange media, of which examples may be found in U. S. Patent 2,366,007 and British Patent 577,707. In addition to the well-known advantages of these media, in particular their high capacity for ion-exchange at all pH values, and their great stability and regular shape, we have found other great advantages when using them to treat wine. Firstly, they do not adversely affect the flavor or character of the wine. This is partly because they do not absorb into their pores the bouquet and taste substances in the wine, partly because they do not exchange these substances, and partly because they do not, as used according to the present invention, seriously affect its acidity. Indeed as a result of this treatment, it is often possible to cause an improvement in a poor wine, such as a cheap Sauterne or Empire Burgundy. This improvement is very marked where it occurs and is obtained by leaving the treated wine in the bottle for a period of a few months. The wine so treated is very much superior to the original wine similarly bottled and aged. The exact conditions for this improvement are not known, but it can be seen how readily this process could be adapted for improving such wines. The second great advantage is that they do not adversely affect the alcohol content of the wine. They do not absorb the alcohol molecules from the wine and hence cause a fall in alcohol content. Another great advantage of using these resins has already been mentioned and it is the small effect that they have on the acidity. This minimization of loss of acidity is of great importance in promoting the stability of wines treated by this method. A method previously proposed for overcoming the drop in acidity as a result of ion-exchange treatment, by adding acid to the regenerant, is definitely detrimental. The first runs of the effluent are much more acid than the original wine, the acidity of the effluent then falling off to a value less than that of the original wine. The resistance of the first run, i. e., the acid runs, to cold, and other factors mentioned above is extremely low, deposition occurring readily even at room temperature. Even if the entire effluent is mixed to produce a wine whose acidity is somewhat lower than that of the original wine, the resistance to cold is still far less than that of wine which has been run thru a column regenerated with a neutral (i. e., substantially non-acid) aqueous solution of sodium chloride.

In fact, by regenerating these media with neutral sodium chloride solution (say, pH greater than 5) or one containing a very small titratable acidity, or other aqueous neutral sodium salt solutions such as sodium sulfate or nitrate, for example, previous processes may be vastly improved upon. The coloring matter of red wines which is so troublesome, is more stable the less acid the wine is and hence by using neutral sodium solution for regeneration not only is simplicity of operation enhanced but an improved result obtained. By using any other media, however, this could not be achieved, because the acidity would be too much affected and the character of the wine spoiled.

A further substantial improvement in the process when ion-exchange methods are used to protect wines from the cold is obtained by the new use in wine treatment which I have discovered, of sulfur dioxide. Sulfur dioxide is frequently added to grape must before fermentation to assist in giving a clean ferment. In some wines, particularly wines of the Sauterne type, a considerable quantity of sulfur dioxide is maintained until the wine is bottled. In red wines and many white wines, sulfur dioxide is never added to the wine after fermentation unless the wine is unsound or considered to be in danger of becoming unsound. In general, the sulfur dioxide content of all wines except those of the Sauterne type very rarely exceeds a total of 100 parts per million. A maximum of 50 p. p. m. is usual. Sulfur dioxide in wines exists in the free and combined states. In the combined states, it must be liberated with caustic soda or similar agent before it can be estimated, but a direct titration of the wine with iodine solution in acid medium gives the free sulfur dioxide content. In all red wines and in white wines generally, except those of the Sauterne type and some light wines, the free sulfur dioxide content never in the normal way exceeds 20 parts per million. It is usually less than 10 p. p. m. Nevertheless, we have discovered that the addition of sulfur dioxide to wines after fermentation is complete; and prior to, during or after treatment by ion-exchange processes greatly increases the effectiveness of such treatment.

Particularly effective results are also obtained by the use of sulfur dioxide in quantity. I have added 400 parts per million in one case and obtained extremely good resistance to cold.

Sulfur dioxide when first added is in the free state but it rapidly combines with other substances in the wine, so that sometimes in a few minutes and in other cases in as much as half-an-hour the amount of free $SO_2$ is halved. Over a period of weeks or months, the exact rate of disappearance depends on many factors such as temperature and amount of aeration, the total sulfur dioxide content of the wine falls also. Nevertheless, I have found that the protection it gives to the wine against the cold is maintained for a considerable period. Furthermore, with relation to this invention if sulfur dioxide is added to wine which has already been passed thru an ion-exchange bed as above, its resistance to deposition in the cold is enhanced. It is clear that the $SO_2$ combines with some substance or substances in the wine to render the formation of deposits less likely. In this way $SO_2$ may be added to the wine over a period ranging from some considerable time before passage thru the ion-exchange medium to any time after such treatment. The amount that is required for a given degree of protection depends on the degree of coloration—a deep red wine may require 200 to 400 p. p. m. while a light red wine such as a tawny port may require only 50 p. p. m. or less. If only mild protection is required, the figures may be lowered still. Similar results are obtained in the case of "brown" wines, e. g. brown sherries. It also depends on how long before the wine is to be bottled for the market that the sulfur dioxide is added. The longer this time is, the greater the amount that must be added for a given degree of protection when bottled.

Sulfur dioxide also assists directly the exchange of undesirable ions in the ion-exchange process such as I have described above. In this case, the free sulfur dioxide appears to be the effective agent. It should be added immediately prior to the treatment. If it is added only a few days before-hand, tho it will operate to prevent deposits due to cold, as described above, it loses some of its effectiveness so far as ion-exchange is concerned.

In winery practice, the sulfur dioxide may be added in various ones of a number of desirable ways, as by burning a sulfur match in the cask before the wine is added, by injection into the wine liquid or gaseous $SO_2$ from a cylinder, or by the addition to the wine of a compound containing sulfur dioxide in combined, available form, as in the form of a salt of sulfurous acid, for instance an alkali bisulfite, or as sodium or potassium metabisulfite (also called metasulfite or pyrosulfite—$Na_2S_2O_5$ or $K_2S_2O_5$—crystals or tablets. In this process we find that direct injection of sulfur dioxide gas into the wine as it goes into the ion-exchange column is the most useful method of adding $SO_2$ to the wine but it can also be added in the form of sodium or potassium metabisulfite tablets or crystals to a cask or tank of the wine before or after treatment. Other substances which produce sulfur dioxide in acid media can also be used but they are rather less effective. By way of example, the salts, both normal and acid, of sulfurous acid ($H_2SO_3$) with or without water of crystallisation may be mentioned, The salts of thiosulfuric acid can also be used but they suffer from the disadvantage that colloidal sulfur also makes its appearance, which would cause considerable trouble in its removal. The use of compounds like sodium acid sulfite ($NaHSO_3$) has the advantage, however, that their addition has less effect on the taste and character of the ions than gaseous sulfur dioxide or sodium metabisulfite.

As regards temperature effects, these are on the one hand Sauterne wines. These are white wines which are generally stable in the cold but suffer from deposits due to the so-called heavy or trace metals, such as copper and iron. In these cases, the higher the temperature of the wine at the time of passing thru the ion exchange bed, the more effective the treatment is. Thus at 65° F. a wine may remain clear in bright daylight for three or four days; treated at 130° F. the same wine may remain clear for as many weeks or longer. These are, on the other hand, red wines, which normally suffer little from deposits caused by iron or copper but are susceptible to cold, behave in the opposite manner. Treatment at high temperatures reduces their resistance to the cold; the best results seem to be obtained over the range 40° F. to 70° F.

The duration of treatment differs not only for different wines but for different treatments and different adverse conditions. Broadly speaking, plain ion-exchange in the cold will protect all wines from deposits caused by standing in a case, or at least not exposed to direct sunlight, at room temperature for at least one year after bottling. With Sauternes and similar wines, treatment hot, i. e. up to about 130° F. or more, will increase the resistance of the wine, compared to the plain treatment as above, to direct sunlight five to ten times. With red wines the addition of sulfur dioxide will increase the resistance of the wine to the cold (i. e. 32° F.) compared to the plain treatment, by two to 100 times depending on many circumstances.

From the foregoing description it will be seen that there is provided a method of purifying wine consisting in passing the wine thru an ion-exchange medium (e. g. thru a column of suitable length) such as a sulfonated polystyrene resin. One brand of this medium is known as Zeo-Carb. 225.

The polystyrene resin may also be brought into contact with the wine in other ways, for example by direct addition of the medium to the wine and subsequently filtering or settling out the spent resin. This method has been found to be less efficient, tho by the addition of resin to a vat of wine and then passage thru a column of the same material, the quality of treatment and useful life of the column relative to the volume of the wine treated can be considerably increased.

In combination with the step of subjecting the wine to the action of the ion-exchange medium, there may be utilized as a further step in the stabilization of all red wines and those wines which have been colored either from the grapes or by some process or addition subsequently, and all white wines except those of the so-called Sauterne type (i. e. low strength sweet wines) which may benefit, the addition of sulfur dioxide after fermentation, that is, after the process of making the wine has been completed and when the time to market the wine is approaching, but before, during or after the wine has passed thru the ion-exchange medium.

Further, sulfur dioxide may be added to wine which has been treated by the methods set forth in the preceding three paragraphs whereby the deposit of soluble coloring matter at low temperatures is prevented or reduced.

By using ion-exchange media of the kind set forth above and conducting the processes in the manner set forth, the flavor and character of the wine is in many cases markedly improved. The improvement is such that an observer not knowing that the wine had been treated by a new process would be inclined to place the wine a whole class higher.

While there are given below certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

*Example 1*

147 gallons of port wine were passed thru 90 lbs. of sulfonated polystyrene resin (e. g. "Zeo-Carb 225") in a bed 4 feet deep and 9 inches in diameter and bottled. This wine remained brilliant for five months, acquired a favorable character, and withstood a temperature of 32° F. for 24 hours without noticeable cloudiness.

The original port wine, on the other hand, went extremely cloudy after 14 days in bottles, and in 20 minutes at 32° F.

*Example 2*

A bed of sulfonated polystyrene resin such as set forth in Example 1 was regenerated with 30 lbs. of industrial common salt (sodium chloride) dissolved in tap water of approximately pH 8. 53 gallons of the same port as above were passed thru the bed, and, at the same time, gaseous sulfur dioxide was passed into the wine at a rate which enabled a concentration of about 275 parts per million to be maintained. This wine withstood a temperature of 32° F. for 256 hours. This wine was considered to have much better character after four months in bottle than the original wine.

*Example 3*

Dark sherry was passed thru a bed of sulfonated polystyrene resin 30 cm. deep and 2 cm. in diameter, and bottled. After 17 months the treated sherry was still brilliant and showed better character than the original wine, which had a deposit and was cloudy.

*Example 4*

An Empire Burgundy was passed thru a column similar to that of Example 3, the bed being regenerated with a solution of industrial common salt in distilled water. The stabilized wine developed an excellent character in the bottle with only a slight deposit after six months; whereas the original wine possessed a very large deposit, and was cloudy at six months.

*Example 5*

In a treatment such as that of Example 4, 400 p. p. m. of sulfur dioxide were passed into the wine as in Example 2. This wine developed an excellent character and had no deposit at all after six months.

*Example 6*

In a treatment similar to that of Example 4, 200 p. p. m. of sulfur dioxide were added to the wine in the form of sodium metabisulfite after the treatment. This wine similarly had no deposit after six months.

*Example 7*

Sauterne wine was passed thru a column similar to that of Example 3 at a temperature of 65° F. The resistance of the wine was measured in white bottles in sunlight, and it did not show cloudiness until eight days, whereas the original wine went cloudy in less than five days.

*Example 8*

In a treatment similar to that of Example 7, the wine was passed thru at a temperature of about 97° F. When similarly measured, it did not show cloudiness until thirteen days.

*Example 9*

In a treatment similar to that of Example 8, the wine was passed thru at a temperature of about 130° F. When similarly measured, it did not show cloudiness until thirty-three days.

*Example 10*

12 gallons of sauterne wine were passed thru a column of sulfonated polystyrene resin 2 feet long and 3 inches in diameter. The resin weighed between 4 and 4½ lbs. Bottles of this wine remained brilliant for 12 months, whereas the untreated samples became cloudy after 3 months. The treated wine had a better character.

Since certain changes may be made in carrying out the above process without departing from the scope of the invention, it is intended that all matter contained in the above description shall be interpreted as illustrative and not in a limiting sense.

I claim:

1. A method of treating wine which comprises reducing the potassium-salt content in the wine without a major reduction of the acidity thereof by subjecting the same to the action of a sulfonated polystyrene ion-exchange medium, in the presence of an aqueous salt solution having a pH greater than 5.

2. A method as set forth in claim 1 wherein the medium is regenerated by treatment with a neutral sodium salt.

3. A method as set forth in claim 2 wherein the sodium salt is sodium chloride.

4. A method as set forth in claim 2 wherein the sodium salt is sodium sulfate.

5. A method as set forth in claim 2 wherein the sodium salt is sodium nitrate.

6. A method as set forth in claim 1 wherein there is added to the liquor a material of the class consisting of sulfur dioxide and materials capable of producing sulfur dioxide.

7. A method as set forth in claim 6 wherein said material is added to the liquor and the liquor contacted with said medium.

8. A method as set forth in claim 6 wherein sulfur dioxide is provided in an amount from 50 parts per million to 450 parts per million.

9. A method as set forth in claim 6 wherein said material is added after fermentation.

10. A method as set forth in claim 6 wherein sulfur dioxide is supplied from a compound containing sulfur dioxide in combined available form.

11. A method as set forth in claim 10 wherein said compound is a salt of sulfurous acid.

12. A method as set forth in claim 11 wherein said compound is an alkali metabisulfite.

13. A method as set forth in claim 12 wherein said compound is a metabisulfite.

14. A method as set forth in claim 12 wherein said compound is sodium acid sulfite.

15. A method as set forth in claim 1 wherein the treatment is carried out at a temperature of from about 65° F. to 140° F.

16. A method as set forth in claim 1 wherein the liquor is also subjected to the action of a reducing agent after fermentation.

17. A method of treating wine which comprises subjecting the same to the action of a sulfonated polystyrene ion-exchange medium regenerated by an aqeuous salt solution having a pH greater than 5.

References Cited in the file of this patent

UNITED STATES PATENTS

| | | |
|---|---|---|
| 2,419,628 | Cohen | Apr. 29, 1947 |
| 2,500,171 | Gause | Mar. 14, 1950 |
| 2,590,076 | Fessler | Mar. 25, 1952 |

OTHER REFERENCES

Text: "Wines and Liquors," by K. M. Herstein and T. C. Gregory, published 1935 by D. Van Nostrand Company, pages 173, 174.

Abstract 136,651 to G. K. Notter, published in volume 662, page 294, O. G., September 2, 1952.